Aug. 12, 1924.

C. H. RICHARDS

UNIVERSAL JOINT

Filed June 24, 1920

INVENTOR:
Carroll H. Richards by Macleod, Calver, Copeland & Dike
Attys.

Aug. 12, 1924.

C. H. RICHARDS 1,504,786

UNIVERSAL JOINT

Filed June 24, 1920   3 Sheets-Sheet 2

INVENTOR:
Carroll H. Richards
by Macleod, Calver, Copeland & Dike
Attys.

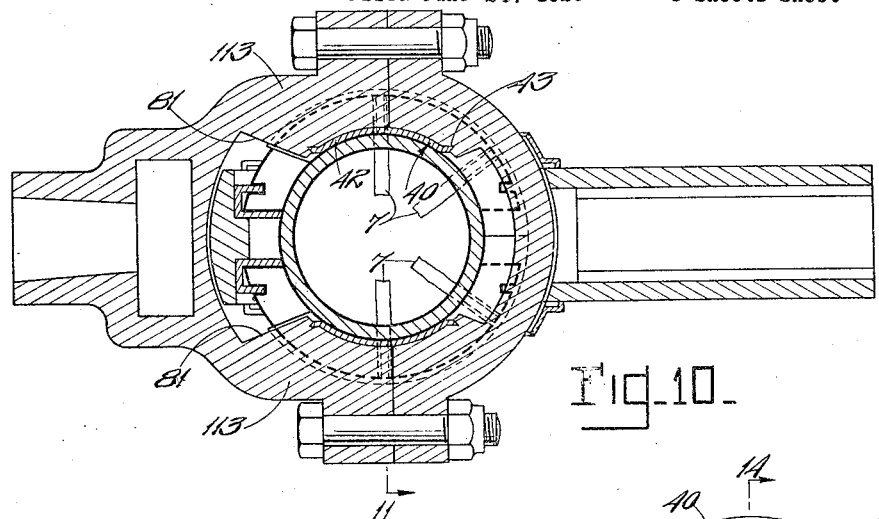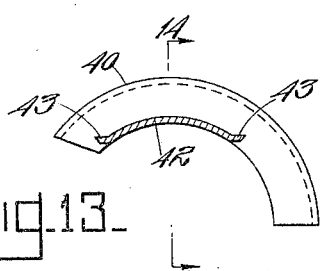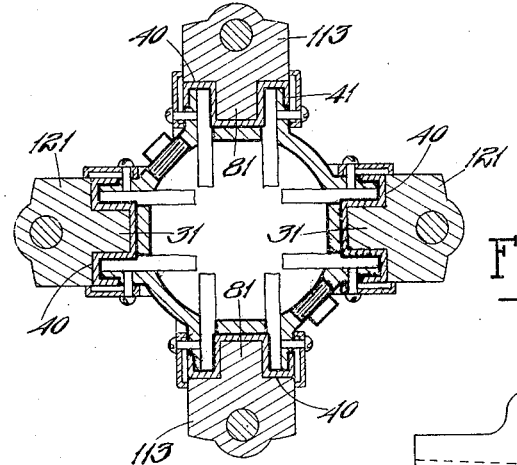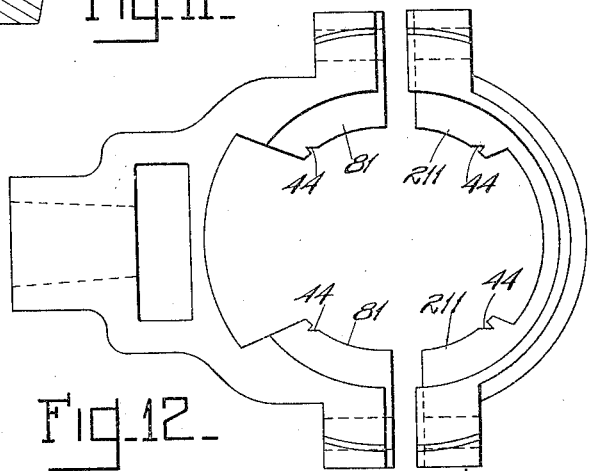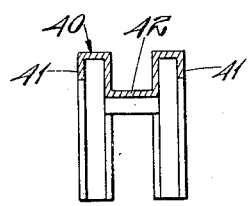

Patented Aug. 12, 1924.

1,504,785

UNITED STATES PATENT OFFICE.

CARROLL H. RICHARDS, OF NEWTON, MASSACHUSETTS.

UNIVERSAL JOINT.

Application filed June 24, 1920. Serial No. 391,500.

*To all whom it may concern:*

Be it known that I, CARROLL H. RICHARDS, a citizen of the United States, residing at Newton, county of Middlesex, State of Massachusetts, have invented a certain new and useful Improvement in Universal Joints, of which the following is a specification, reference being had therein to the accompanying drawings.

The invention relates to a new and useful improvement in universal joints. It relates especially to that class of universal joints which are employed to connect two shafts. The invention is an improvement on the device shown and described in Letters Patent No. 960,327, June 7, 1910, to Lewis M. Hosea. In the device shown in said patent the joint comprises two bifurcated coupling elements and an intermediate spherical element connected with said bifurcated elements, said spherical element being made hollow and used also as an oil reservoir for lubrication of the rubbing surfaces.

One feature of the present invention relates to the oiling mechanism. Another feature of the invention relates to a dust protector for the joint. Other features will be set forth more particularly in the specification and claims hereinafter.

In the device shown in said prior patent, the ball is formed with minute apertures through which the oil is driven by centrifugal force during the rotation of the shaft and joint. It has been found that although these apertures were made very minute, being open throughout, the oil discharges too freely and results in a loss of oil as well as a gumming up of the parts, and other objections due to an excess of oil in the parts which are to be lubricated.

One object of the present invention is to provide means to prevent the too free discharge of oil from the ball reservoir while still utilizing the centrifugal force in part to feed the oil.

One means by which this is accomplished is by the use of wicks in form of plugs which close the apertures sufficiently to prevent discharge of the oil in jets or spray and which are of suitable material to permit slow passage of the oil by capillary attraction after the manner of a slow feeding wick, so that the oil is applied to the parts by the rubbing contact of the wick. The oil is not driven out in spurts or in a spray, as in the said patent, although the centrifugal force somewhat aids the capillary attraction of the wick.

Means for still further reducing the centrifugal force consists in making the oil passage of such form that instead of taking a radial or straight outward course as in the said prior patent, it has an angular course whereby after having first moved in a radially outward direction it meets with an obstruction and is then caused to turn and flow in a somewhat backward direction thus checking the force of the discharge, and then to turn in an outward direction again against the action of the centrifugal force.

The invention will be fully understood from the following description when taken in connection with the accompanying drawings, and the novel features will be pointed out and clearly defined in the claims at the close of this specification.

In the drawings, Fig. 1 is a view of a universal joint embodying the invention.

Fig. 10 is a sectional view of a universal joint showing a modified form of my invention.

Fig. 11 is a section taken on line 11 of Figure 10.

Fig. 12 is a detail view showing one of the forks for the joint shown in Figures 10 and 11 and the strap therefor in disassembled relation.

Fig. 13 is a detail view of one of the bushings used with the modified form of joint.

Fig. 14 is a section taken on line 14—14 of Figure 13.

Figure 1:
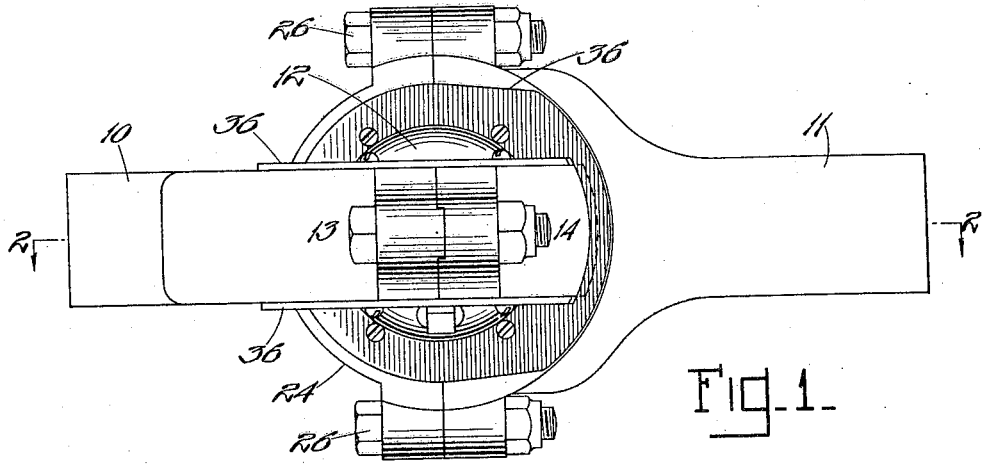

Referring now to the drawings, 10 and 11 represent the shanks of the two bifurcated coupling elements, and 12 the spherical oil containing element with which said bifurcated elements are connected. Each of the two shank members 10—11 is constructed for engagement with contiguous ends of two shafts (not shown) which are to be connected together by the joint. The two coupling elements 10—11 are duplicates of each other and are connected in like manner with the hollow sphere or ball 12, but the jaws of one coupling element lie in a plane at an angle of 90° from the plane in which the jaws of the other coupling element lie; that is, if the jaws of one element are in a vertical plane, the jaws of the other element are in a horizontal plane, but the axis of each is in line with its respective shaft, so that if the axes of the two shafts are in the same straight line then the axes of the two coupling elements will be in the same straight line, and if the axes of the shafts are at an angle to each other then the axes of the shanks of the coupling elements will be at an angle to each other, but the planes of the two sets of jaws will always be maintained at right angles to each other.

The coupling element 10 is formed with two similar jaws 13—13 each having an inner periphery on an arc of a circle, and the outer ends of said two jaws 13—13 are connected by a semi-circular strap 14 whose inner periphery combines with the inner periphery of the two jaws 13—13 to encircle the ball 12. The jaws 13—13 are formed respectively with lugs 15—15 at their outer ends, and the strap 14 is formed with lugs 16—16 at its ends whose faces engage the faces of the lugs 15—15 respectively. The said lugs are formed with bolt holes, so that the strap may be detachably connected with the jaws by bolts 17.

Figure 15:
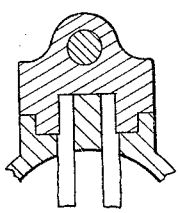
Fig. 15 is a sectional view showing another modified form of the invention.

The combined jaws and strap have a tongue and groove connection with the ball 12 by a sliding fit. The preferred form is to provide the ball with the grooves and to provide the jaws and strap with tongues. This construction is shown in Figures 1 to 8. This arrangement, however, may be reversed so as to have the jaws and strap provided with grooves and have the ball provided with the tongues. This latter method is shown in Figure 15.

In the form shown in Figures 1 to 8, the jaws 13 are each formed with tongues 8 on an arc of a circle concentric with the periphery of the ball, and the ball is formed with parallel peripheral flanges 19—19 forming between them a groove 30 within which the tongues 8 have a sliding fit. The strap 14 is also formed with tongues 2 which form a sliding fit in the groove 30 formed between the flanges 19—19 of the ball.

As already stated the other coupling member connected with the shank 11 is constructed in a similar manner to that already described with reference to the first coupling member. It has the jaws 21—21 provided with arc-shaped tongues 3 which engage with grooves formed between the peripheral flanges 23—23 on the outer periphery of the ball which intersect the grooves formed by the flanges 19—19 at right angles thereto.

The two jaws 21—21 cooperate with a complementary strap 24 formed with a tongue 5, which also engages with the grooves formed between the projecting flanges or ribs 23—23. The jaws 21—21 are connected with the strap 24 by means of bolts 26.

Figure 5:
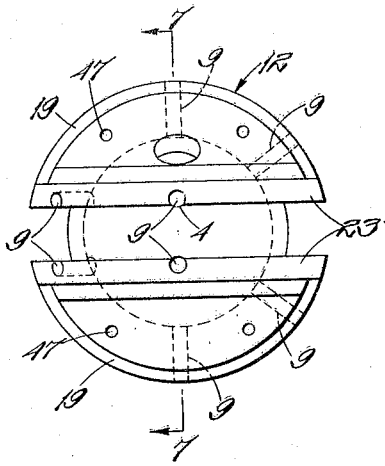
Figure 6:
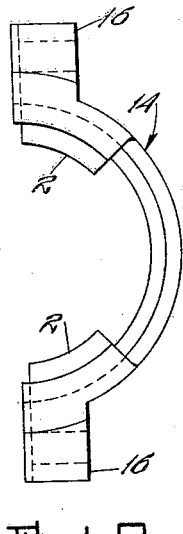

The ball is formed with a plurality of apertures 9 which extend through the periphery of the ball and through the ribs or flanges 19—19 and 23—23. Said apertures where they pass through the flanges 19 and 23 cut through the inner face of the flange, as shown in Figure 5, thus forming a narrow slit 4 through the walls of the flanges into the grooves 30 which are engaged by the tongues 2 and 8.

Figure 2:
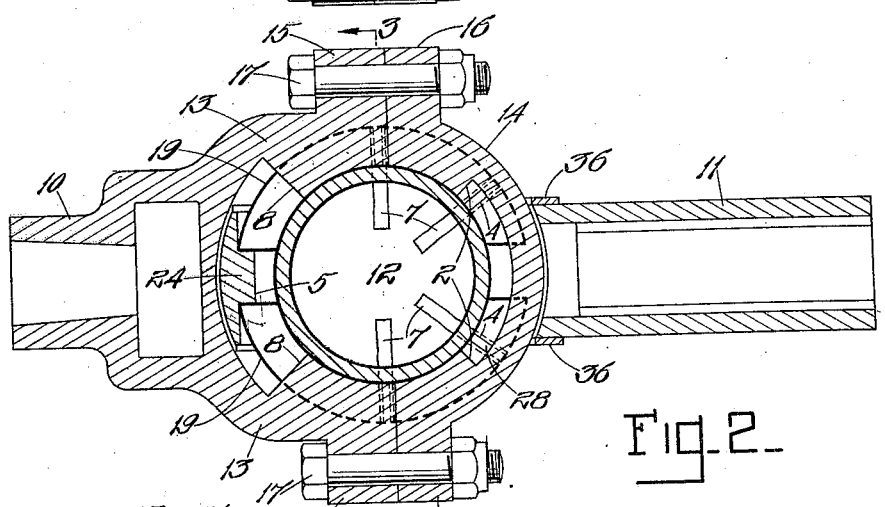
Fig. 2 is a section on line 2—2 of Figure 1.
Figure 3:
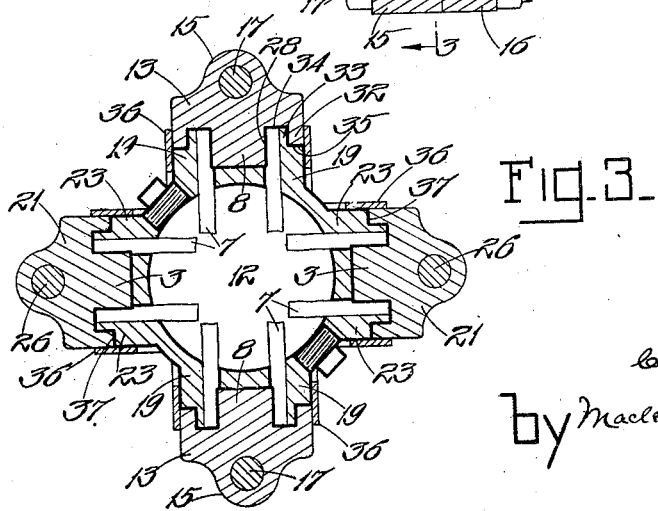
Fig. 3 is a section on line 3—3 of Figure 2.
Figure 4:
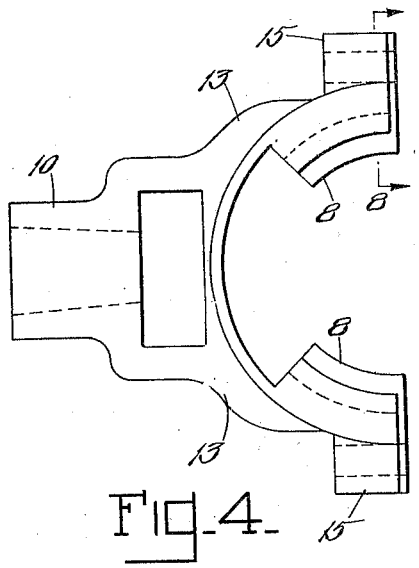
Figs. 4, 5 and 6 are respectively detail views of one of the forks, the ball joint and the strap for the fork.

Plugging wicks 7 are inserted in these several apertures, the inner ends extending into the interior of the ball, as shown in Figures 2 and 3, so that they dip into the oil within the ball and extend outward to the outer end of the flanges 19 and 23. These wicks should fit very snugly in the apertures to plug the apertures tight, so that no oil will pass through them except by the capillary attraction of the wicks aided slightly by the centrifugal force. Preferably these wicks are made of leather although they might be of fibre, or other suitable compressible and flexible material, but I prefer leather to vegetable fibre because while it is compressible and is sufficiently fibrous to allow a certain amount of capillary attraction for the oil, yet does not allow such free capillary attraction as does vegetable fibre. It serves as a plug through which the oil will very slowly permeate.

The inner face 28 of that portion of each wick which comes against the slit 4 will become flattened by its contact with the side face of the tongues.

Figure 7:
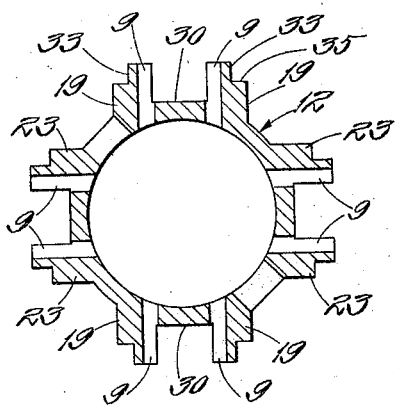
Fig. 7 is a section taken on line 7—7 of Figure 5.
Figure 8:
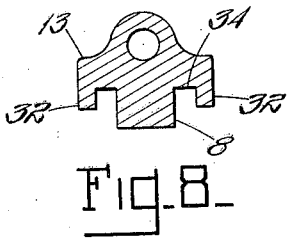
Fig. 8 is a section on line 8 of Figure 4.

As the centrifugal force during the rotation of the shaft and joint tends to throw the oil outwardly, if there were a straight passage between the members of the joint, even a crevice, directly outward from the end of the wick, the oil would be expelled from the joint and thus would escape through the joint in excessive quantities even with the use of the plugging wick. For this reason I provide an interrupted path for the oil after it leaves the end of the wick. In the preferred form of construction the outward ends of the flanges or ribs 19 and 23 are rabbeted, and the jaws 13 and 21 are also rabbeted to fit the rabbeted ends of the flanges, as shown in Figures 3, 7 and 8. The rabbets thus form lips 32 on the jaws and lips 33 on the flanges of the ball, which overlap each other, as shown in Figure 3. Preferably the flanges on the jaws are outside of the flanges on the ball, although it is obvious that the arrangement might be reversed. It will thus be seen that as the oil follows the wick outward, it strikes against a shoulder 34 in the jaw at the end of the wick, and thence is obliged to flow backward between the lips 32 and 33 in an opposite direction to the action of centrifugal force until it strikes the shoulder 35 formed by the rabbet in the flange 19 of the ball where it meets with obstruction and then passes laterally outward between the lip 32 and the shoulder 35 of the flange 19.

It will thus be seen that the oil will be applied by the wicks or plugs to the side faces of the tongues 8 and of the flanges 19, and will also traverse all the crevices in the joint but will be retarded in its passage by reason of its being compelled to flow backwards in an opposite direction to the action of the centrifugal force.

Figure 9:
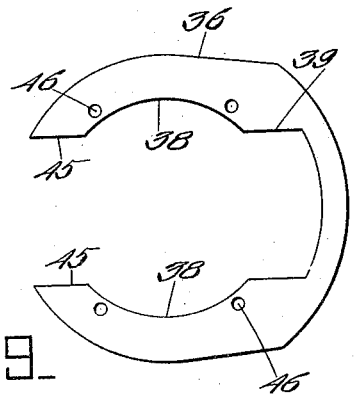
Fig. 9 is a detail view of one of the dust covers.

To protect the joint against the entrance of dust, I provide dust plates or covers 36 which are secured to the flanges of the ball to cover the crevices 37. Preferably these dust covers are somewhat horseshoe-shaped, as shown in Figure 9, being shaped to fit over the parts. Each dust cover is preferably a thin sheet of metal or fibre, or other suitable material, in flattened shape as shown in Figures 1, 3 and 9, so that it fits snug up against the flat outer faces of the jaws, having the two arc-shaped inner edges 38—38 to clear the curved periphery of the ball, and having the wide groove 39 with arc-shaped base to straddle the strap of the other pair of coupling elements, the ends 45, 45 being spaced apart from each other to permit them to straddle the jaw and dust covers of the said other pair of coupling elements. Each dust cover is secured in position by screws passing through holes 46 in the dust cover and into holes 47 in the flanges on the spherical member.

In the form shown in Figures 10 to 14, the jaws of the coupling members are provided with linings or bushings 40 of thin metal. In this form of construction the jaws 113 and 121 which correspond relatively with the jaws 13 and 21 of the form shown in Figures 1 to 8, are formed with a tongue 81 in similar manner to the tongue 8 previously described, but instead of having the lips 32 engage with the rabbeted flange of the ball, the bushings are formed with lips 41 which lap over the outer sides of the flanges of the ball, and engage with the shoulder formed by the rabbeted outer face of the side flanges of the ball, as shown in Figure 11. In this case the tongues 81 and 31 are made thin enough so that the bushing will fit between the tongues and the flanges of the ball through which the wick aperture is made, so that the bushing is engaged by the side of the wick which projects through the slot in the side of the flange of the ball, as in Figure 3. The oil follows the inner face of the bush and is transmitted to the several rubbing parts of the joint.

In order to lock the said bushings in position, they are each formed with a laterally extending flange 42 (see Figure 13) projecting from its inner periphery, said flange being bent at each end to form a beveled faced tooth 43, and the tongues 81 of the jaws and 211 of the cooperating straps are formed with notches 44 shaped something like a ratchet tooth with which said teeth 43 of the bushing engage to lock the bushings against displacement.

What I claim is:

1. A universal joint comprising two coupling members and an intermediate hollow lubricant holder having a curved periphery, each coupling member having sliding engagement with the periphery of said lubricant holder, means by which lubricant is fed from the interior of said holder to the surfaces of the engaging portions of the said coupling members, and covers closely fitting over the joints between the said coupling members and said lubricant holder to prevent escape of lubricant and entrance of dust.

2. A universal joint comprising two coupling members and an intermediate hollow lubricant holder, each of said coupling members having two jaws and a co-operating strap which encircle the said lubricant holder, means whereby the lubricant is fed from the said holder to the bearing surfaces of the coupling members, covers closely fitting over the joints between the said lubricant holder and the said jaws and straps, to prevent the escape of lubricant and entrance of dust.

3. A universal joint having two coupling elements for connection respectively with two shafts, an intermediate hollow spherical member, each coupling element having two jaws and a cooperating strap member which together encircle the spherical member and have a tongue and groove engagement with the spherical member, the spherical member being formed with a plurality of apertures through its periphery, plugging wicks in said apertures whose inner ends are exposed to oil in the interior of the spherical member and which conduct the oil through the wall of the spherical member to the said cooperating coupling members, and guide lips which project toward the spherical member from the jaws of the coupling members and straddle the walls of the groove to deflect the oil in a reverse direction after its passage outwardly by the wick.

4. A universal joint having two coupling elements for connection respectively with two shafts, an intermediate hollow spherical member, each coupling element having two jaws and a cooperating strap member which together encircle the spherical member and have a tongue and groove engagement with the spherical member, the spherical member being formed with a plurality of apertures through its periphery, plugging wicks in said apertures whose inner ends are exposed to oil in the interior of the spherical member and which conduct the oil through the wall of the spherical member to the said cooperating coupling members, and dust covers secured to the outer side faces of the said coupling elements and covering the joints between the coupling elements and the spherical element.

5. A universal joint having two coupling elements for connection respectively with two shafts, an intermediate hollow spherical member, each coupling element having two jaws and a cooperating strap member which together encircle the spherical member and have a tongue and groove engagement with the spherical member, the spherical member being formed with a plurality of apertures through its periphery, plugging wicks in said apertures whose inner ends are exposed to oil in the interior of the spherical member and which conduct the oil through the wall of the spherical member to the said cooperating coupling members, the apertures in which the wicks are held extending outward through the side walls of the grooves, the inner faces of the side walls of the grooves being slit longitudinally of the said apertures to connect therewith, whereby the side of the wick will project through the slit and engage the face of the jaw member which fits in said groove.

6. A universal joint having two coupling elements for connection respectively with two shafts, an intermediate hollow spherical member, each coupling element having two jaws and a cooperating strap member which together encircle the spherical member and have a tongue and groove engagement with the spherical member, bushings between the interengaging portions of the jaws and the spherical member, the spherical member being formed with a plurality of apertures through its periphery, and plugging wicks in said apertures whose inner ends are exposed to oil in the interior of the spherical member and which conduct the oil through the wall of the spherical member to the said cooperating coupling members.

7. A universal joint having two coupling elements for connection respectively with two shafts, an intermediate hollow spherical member, each coupling element having two jaws and a cooperating strap member which together encircle the spherical member and have a tongue and groove engagement with the spherical member, bushings between the interengaging portions of the jaws and the spherical member, the spherical member being formed with a plurality of apertures through its periphery, plugging wicks in said apertures whose inner ends are exposed to oil in the interior of the spherical member and which conduct the oil through the wall of the spherical member to the said cooperating coupling members, said bushings being separable from the coupling elements, said bushings and coupling elements having interengaging portions for locking them together in a manner to permit them to be detached when the coupling members are detached.

8. A universal joint having two coupling elements for connection respectively with two shafts, an intermediate hollow spherical member, each coupling element having two jaws and a cooperating strap member which together encircle the spherical member and have a tongue and groove engagement with the spherical member, bushings between the interengaging portions of the jaws and the spherical member, the spherical member being formed with a plurality of apertures through its periphery, plugging wicks in said apertures whose inner ends are exposed to oil in the interior of the spherical member and which conduct the oil through the wall of the spherical member to the said cooperating coupling members, said bushings being shaped to fit the contour of the inner periphery of the coupling members and the strap members, and having a laterally extending flange on its inner periphery formed with teeth at its ends, and the said jaws and straps being formed with notches with which said teeth engage to lock the bushings to the jaws to prevent a rotary sliding movement of the bushings with relation to the jaws and straps.

9. A universal joint comprising two coupling members and an intermediate hollow lubricant holder having a curved periphery, each coupling member having a sliding engagement with the periphery of the said lubricant holder, means whereby the lubricant is fed from the said holder to the bearing surfaces of the said coupling members, anti-centrifugal, oil baffling joints between the said coupling members and said lubricant holder, and covers closely fitting over said joints to prevent the escape of lubricant and entrance of dust.

10. A universal joint comprising two coupling members for connection respectively with two shafts, and an intermediate hollow lubricant holder having a curved periphery, a tongue-and-groove connection between the outer surfaces of said lubricant holder and each of said coupling members, means whereby lubricant is fed from the interior of said holder to the bearing surfaces of said coupling members and lubricant holder, anti-centrifugal, oil baffling joints between said coupling members and said lubricant holder, and covers closely fitting over the said joints to prevent escape of lubricant and entrance of dust.

11. A universal joint having two coupling elements, an intermediate hollow lubricant container, said coupling elements having jaws which have a tongue-and-groove engagement with the lubricant container, means whereby the lubricant is fed from the container to the interengaging surfaces of the coupling members and the lubricant container, and members which contact with the outer faces of the engaging portions of the lubricant container and coupling members and closely cover the joints between said container and coupling members.

In testimony whereof I affix my signature.

CARROLL H. RICHARDS.